United States Patent
Shah et al.

(10) Patent No.: US 12,454,471 B1
(45) Date of Patent: Oct. 28, 2025

(54) ELECTROCHEMICAL DEVICE AND METHOD FOR SIMULTANEOUS DETECTION AND RECOVERY OF METALS IONS FROM WASTEWATER

(71) Applicant: United Arab Emirates University, Al Ain (AE)

(72) Inventors: Afzal Shah, Islamabad (PK); Iltaf Shah, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/647,446

(22) Filed: Apr. 26, 2024

(51) Int. Cl.
 *C02F 1/467* (2023.01)
 *C02F 1/461* (2023.01)
 *C02F 101/20* (2006.01)

(52) U.S. Cl.
 CPC ........ *C02F 1/4678* (2013.01); *C02F 1/46109* (2013.01); *C02F 2001/46119* (2013.01); *C02F 2001/46138* (2013.01); *C02F 2001/46152* (2013.01); *C02F 2101/20* (2013.01); *C02F 2201/4614* (2013.01); *C02F 2209/06* (2013.01)

(58) Field of Classification Search
 CPC ................ C02F 1/4678; C02F 1/46109; C02F 2001/46119; C02F 2001/46138; C02F 2001/46152; C02F 2001/20; C02F 2001/4614; C02F 2209/06
 See application file for complete search history.

(56) References Cited

U.S. PATENT DOCUMENTS

2024/0389898 A1* 11/2024 Greene Iv ......... B01L 3/502715

FOREIGN PATENT DOCUMENTS

| CN | 111307917 A | * | 6/2020 | ........... G01N 27/308 |
| CN | 114563460 A | * | 5/2022 | |
| WO | WO-2017117373 A1 | * | 7/2017 | ............. B01D 53/32 |

OTHER PUBLICATIONS

Munir et al., Selective and simultaneous detection of Zn2+, Cd2+, Pb2+, Cu2+, Hg2+, and Sr2+ using surface modified electrochemical sensors, Electrochimica Acta, 2019, 323, 134592 (Year: 2019).*

(Continued)

*Primary Examiner* — Luan V Van
*Assistant Examiner* — Shizhi Qian
(74) *Attorney, Agent, or Firm* — MH2 Technology Law Group, LLP

(57) ABSTRACT

There is disclosed a metal ion detection device, comprising a working electrode on which a droplet of the solution sample is placed, a counter electrode; and a reference electrode, wherein a droplet of a pH indicator solution is further placed on the working electrode surface after drying the working electrode surface, leading to conversion of metal ions present in the solution sample to corresponding metal atoms and deposition of the metal atoms on the working electrode surface. The working electrode is a glassy carbon electrode modified with amino-functionalized multi-walled carbon nanotubes (MWCNTs-NH$_2$) and an amide derivative of benzoic acid (ADB). The device enables multi-metal ions detection, toxic metal ions removal from wastewater and metals enrichment/recovery via electroreduction. A method of detecting multiple co-existing metal ions from a solution sample is also proposed.

11 Claims, 3 Drawing Sheets

(56) References Cited

OTHER PUBLICATIONS

Aslam et al., Multiwalled Carbon nanotube/Fe-doped ZnO-based sensors for droplet electrochemical detection and degradation monitoring brilliant green, ACS Applied Nano Materials, 2023, 6, 6172-6185 (Year: 2023).*

Aslam et al., Supporting Information of Multiwalled Carbon nanotube/Fe-doped ZnO-based sensors for droplet electrochemical detection and degradation monitoring brilliant green, ACS Applied Nano Materials, 2023, 6, 6172-6185 (Year: 2023).*

Hayat et al., A designed miniature sensor for the trace level detection and degradation studies of the toxic dye Rhodamine B, RSC Adv., 2022, 12, 15658 (Year: 2022).*

Zuo et al., Crystallisation control of drop-cast quasi-2D/3D perovskite layers for efficient solar cells, Communications materials, 2020, 1:33, https://doi.org/10.1038/s43246-020-0036-z (Year: 2020).*

Zuo et al., Supporting Information of Crystallisation control of drop-cast quasi-2D/3D perovskite layers for efficient solar cells, Communications materials, 2020, 1:33, https://doi.org/10.1038/s43246-020-0036-z (Year: 2020).*

Elimelech et al., Chapter 5. Modelling of particle deposition onto ideal collectors, pp. 113-156 in Particle Deposition and Aggregation-Measurement, Modelling and Simulation, Elsevier, 1995 (Year: 1995).*

Ding et al., Electrochemical detection of heavy metal ions in water, ChemComm, 2021, 57, 7215 (Year: 2021).*

Raju et al., Emerging insights into the use of carbon-based nanomaterials for the electrochemical detection of heavy metal ions, Coordination Chemistry Reviews, 2023, 476, 214920 (Year: 2023).*

Ferancova et al., Rapid and direct electrochemical determination of Ni(II) in industrial discharge water, Journal of Hazardous Materials, 2016, 306, 50-57 (Year: 2016).*

Göde et al., A novel electrochemical sensor based on calixarene functionalized reduced graphene oxide: application to simultaneous determination of Fe(III), Cd(II) and Pb(II) ions, Journal of Colloid and Interface Science, 2017, 508, 525-531 (Year: 2017).*

Khan et al., SDBS-functionalized MWCNT/poly(o-toluidine) nanowires modified glassy carbon electrode as a selective sensing platform for $Ce^{3+}$ in real samples, Journal of Molecular Liquids, 2019, 279, 392-399 (Year: 2019).*

Manzoor et al., Electrochemical detection of mercuric(II) ions in aqueous media using glassy carbon electrode modified with synthesized tribenzamides and silver nanoparticles, RSC Advances, 2022, 12, 1682 (Year: 2022).*

Imtiaz et al., Electrochemical nanosensor for ultrasensitive detection of malachite green and monitoring of its photocatalytic degradation, Clean Water, 2022, 5, 69 (Year: 2022).*

* cited by examiner

ELECTROCHEMICAL DEVICE AND METHOD FOR SIMULTANEOUS DETECTION AND RECOVERY OF METALS IONS FROM WASTEWATER

FIELD OF THE INVENTION

The present invention relates to the field of detection and recovery of metal ions, and more particularly to an electrode modifier, its stability and role in enhancing the detection signals of target metal ions, and its removal.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Heavy metal (HM) ions, particularly Pb(II), Cd(II), Hg(II) and Tl(I), are highly toxic even in minute quantities. Urbanization, industrialization and agricultural activities are mainly responsible for the release of wastewater containing heavy metal ions. They are also released from mining, domestic sewage, disposal of electronic equipment and fertilizer waste. In addition, metal-based fertilizers and contaminated irrigation water lead to increased accumulation of metal ions in crops and food. This raises concerns about food safety and the potential for metal exposure through the food chain. Metal ions from groundwater can be transported downstream and accumulate in sediments or be taken up by aquatic organisms. The fate and transport of heavy metals in the environment is influenced by a number of factors, including pH of the medium, salinity, physical, chemical and biological processes. Heavy metals can bind to protein binding sites in animal and plant cells, resulting in the replacement of the original metal in metalloproteins, which disrupts the cell chemistry, leading to disruption of the basic mechanisms and consequent normal functioning of cells. The presence of HM ions in water is of global concern because it is difficult to assess their safe limits in biotic systems. The accumulation of sulfur and nitrogen oxides in the environment makes rainwater acidic. The resulting acid rain leaches HM from rocks and soils and causes their induction into surface waters, contaminating rivers, lakes and streams.

Contamination of water leads to disruption of the food web. Due to their persistence in the environment, HM are bio accumulative and cause health problems due to their acute toxicity. While Cu, Fe, Ni and Zn are essential for biochemical processes in trace amounts, Pb, Cd, Hg, Tl and As are non-essential elements that are highly toxic even in small amounts and cause serious health problems. The optimal level of metals in plants is also important for their normal functioning. However, a disturbance in the optimum level of metals affects their transpiration rate and can damage the chloroplasts, which in turn reduces the rate of photosynthesis. Metals concentrations above their threshold levels disrupt the microbial balance in the soil and reduce soil fertility. The accumulation of HMs in the biota of riverine ecosystems has serious consequences for humans and animals. HMs are thought to be responsible for abnormalities in fish species because they accumulate in fish gills and disrupt their communication with the environment. In general, such abnormalities have a detrimental effect on fish survival and growth rates. The toxic effects of HMs on aquatic ecosystems include reduced biodiversity, reproductive failure and death of aquatic organisms. Once they enter the human body through the food chain, HM ions cause irreversible and permanent damage to human health. The health effects of lead (Pb) include abdominal pain, anemia, impaired cognitive function and neurological damage. Similarly, arsenic (As) is hazardous because its binding in the form of trivalent arsenite to the thiol or sulfhydryl group of protein can cause inactivation of some 200 enzymes.

Cadmium (Cd) is known to cause adverse health effects such as carcinogenicity, kidney and bone damage, respiratory and reproductive problems. Mercury (Hg) can cause neurological and behavioral disorders. Many inorganic salts of Hg and some organic Hg compounds, such as methylmercury, which is water soluble, can enter the aquatic food chain, resulting in biomagnification and adverse health effects. Chromium (Cr) is classified as a category 1 human carcinogen. Accumulation of cerium (Ce) affects the liver and causes pulmonary embolism. Strontium (Sr) damages the liver and kidneys. Some metal ions are essential and play critical roles in biochemical processes such as metabolic regulation, electrolyte balance, catalysis, cell signaling, acid-base homeostasis, neurotransmission, muscle contraction and cardiac function. However, in excess of acceptable levels, they also cause health problems; for example, excess copper causes fatal poisoning, accumulation of iron leads to liver cancer, excess nickel causes respiratory problems and high levels of zinc affect protein metabolism. The detection of metal ions is therefore a key issue in safeguarding public health and protecting life on land and in water. In this context, it is a social obligation to develop highly sensitive and selective devices for the detection of heavy metal ions.

The rapid advancement in technology has enabled the development of different techniques, such as atomic absorption spectroscopy, atomic force microscopy, Inductively Coupled Plasma (ICP) and Inductively Coupled Plasma Mass Spectrometry (ICP-MS) that facilitate the detection of HMs and help in evaluating their tolerance limits. Yet the selection of the method relies on the particular application, specific metals in question, and the level of sensitivity and accuracy needed. ICP works at very high temperature for ionizing metals, and ICP-MS requires expensive equipment and skilled operators. Additionally, ICP-MS cannot distinguish between different oxidation states of an element, which is important for speciation studies of HM. Similarly, ion chromatography (IC) is also used for heavy metal ions detection.

Based on the above explained, there exists a need for better detection, removal, and recovery of metal ions, and a method of performing the same, which overcomes the drawbacks of the traditionally employed devices/methods.

SUMMARY OF THE INVENTION

Therefore it is an object of the present invention to propose an electrode modifier, its stability and role in enhancing the detection signals of target metal ions, and its removal.

There is disclosed a metal ion detection device, comprising a working electrode on which a droplet of the solution sample is placed, a counter electrode; and a reference electrode, wherein a droplet of a pH indicator solution is further placed on the working electrode surface after drying the working electrode surface, leading to conversion of metal ions present in the solution sample to corresponding metal atoms and deposition of the metal atoms on the working electrode surface.

In an embodiment of the invention, the metal ions are converted to corresponding metal atoms and deposited/electroplated on the working electrode surface.

In another embodiment of the invention, the device enables multi-metal ions detection, toxic metal ions removal from wastewater and metals enrichment/recovery via electroreduction.

In another embodiment of the invention, the metal ions are Zn(II), Tl(I), Cd(II), Pb(II), Ni(II), As(III), Cu(II), Hg(II), Fe(III), Sr(II), and Ce(III).

In another embodiment of the invention, the working electrode is a glassy carbon electrode modified with amino-functionalized multi-walled carbon nanotubes (MWCNTs-$NH_2$) and an amide derivative of benzoic acid (ADB).

In an embodiment of the invention, the counter electrode is a platinum wire.

In an embodiment of the invention, the reference electrode is Ag/AgCl.

In another embodiment of the invention, the pH indicator solution is Britton Robinson Buffer (BRB).

As another aspect of the present invention, a method of detecting multiple co-existing metal ions from a solution sample is proposed, the method comprising placing a droplet of the solution sample on a working electrode surface; drying the working electrode surface followed by applying a second droplet of a pH indicator solution on the electrode surface, leading to conversion of the co-existing metal ions to corresponding metal atoms and deposition/electroplating of the metal atoms on the working electrode surface.

In another embodiment of the invention, the method further comprises creating a droplet cell by allowing probes of a counter electrode and reference electrode to be brought in contact with the formed solution sample and pH indicator solution droplet mixture.

In another embodiment of the invention, the co-existing metal ions are detected individually or in combination.

In another embodiment of the invention, the second droplet of the pH indicator solution is used for recording voltammogram readings after formation of the droplet cell.

In another embodiment of the invention, the detecting of metal ions is done individually or in combination-simultaneously.

In another embodiment of the invention, the drying is done via a drier kept at a distance of at least 20 cm away from the electrode surface so as to avoid the droplet from moving away from the electrode surface.

In another embodiment of the invention, the pH indicator solution is Britton Robinson Buffer (BRB).

In another embodiment of the invention, the pH indicator solution is an aqueous solution of NaCl, phosphate buffer (pH 7), HCl, $H_2SO_4$, KCl, NaOH, $H_3BO_3$, or acetate buffer solution of pH 5.

In another embodiment of the invention, the metal ions are Zn(II), Tl(I), Cd(II), Pb(II), Ni(II), As(III), Cu(II), Hg(II), Fe(III), Sr(II), and Ce(III).

In another embodiment of the invention, the working electrode is a glassy carbon electrode modified with amino-functionalized multi-walled carbon nanotubes (MWCNTs-$NH_2$) and an amide derivative of benzoic acid (ADB).

In another embodiment of the invention, the deposited metals are removed from the electrode and the cleaned electrode is used again for modification with an amide derivative of benzoic acid (ADB) and amino-functionalized multi-walled carbon nanotubes (MWCNTs-$NH_2$) for further removal of metals.

In another embodiment of the invention, the method further comprises scratching the metal atoms from the electroplated working electrode; and dissolving the modifier (ADB and $NH_2$-fMWCNTs) by putting the electroplated working electrode in a mixture of dimethylformamide (DMF) and dimethyl sulfoxide (DMSO).

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
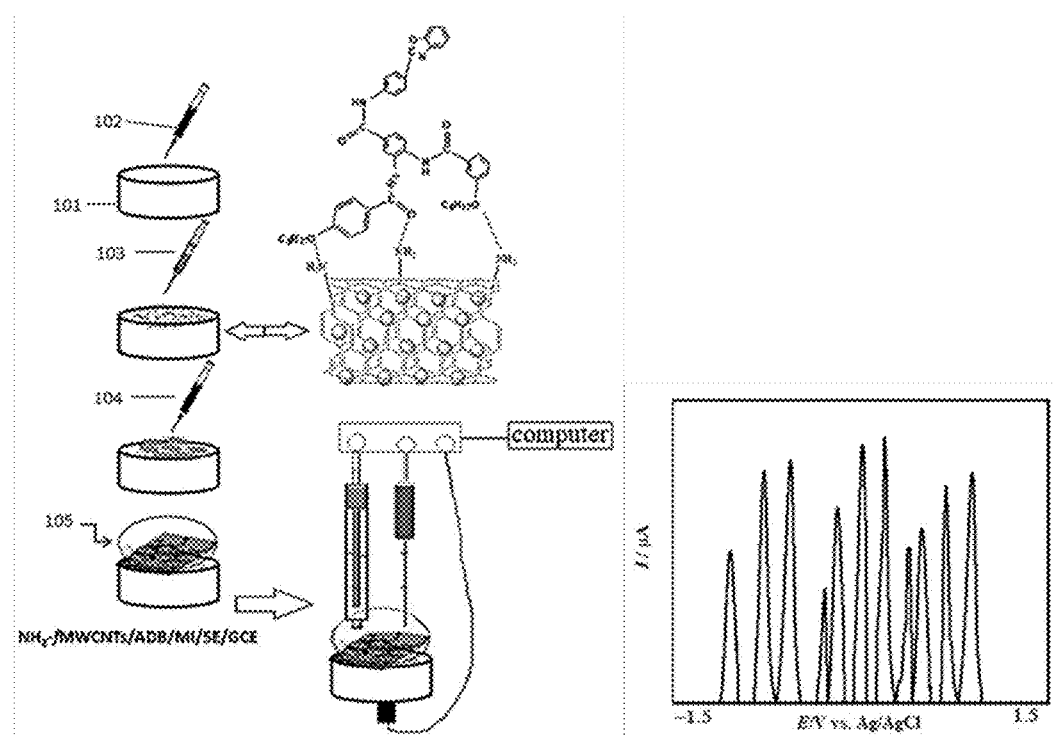
FIG. 1 shows an overall design of the proposed electrochemical device and its metal ions sensing performance, in accordance with the present invention.

The aspects of the proposed metal ion detection device and method of detecting co-existing metal ions-according to the present invention will be described in conjunction with FIGS. 1-4. In the Detailed Description, reference is made to the accompanying figures, which form a part hereof, and which is shown by way of illustration of specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Researchers have previously developed a plethora of sensing devices that focus on the detection of single type of metal ions. But the issue is the coexistence of multiple heavy metal ions and their mutual interference. Accordingly, there is an urgent practical demand to overcome this challenge by developing a detection tool which simultaneously responds to multiple coexisting heavy metal ions conveniently and reliably. The proposed metal ion detection device not only detects but also removes all coexisting metal ions from wastewater and allows their recovery. Moreover, the proposed device is stable owing to the fact that the electrode modifier is not soluble in water and hence maintains its integrity as it does not leach away from the electrode surface.

The present invention discloses an electrode modifier-its electrode anchoring without a binder—it's stability and role in enhancing the detection signals of target metal ions, and its removal. A metal ion detection device is proposed, comprising a working electrode on which a droplet of the solution sample is placed, a counter electrode, and a reference electrode, wherein a droplet of a pH indicator solution is further placed on the working electrode surface after drying the working electrode surface, leading to conversion of metal ions present in the solution sample to corresponding metal atoms and deposition of the metal atoms on the working electrode surface. The proposed device senses 11 metals ions simultaneously. The primary reason for this is the construction and method of the device, using a specific electrode modifier (N-{4-[2-(1,3-Benzoxazolyl)] phenyl}-3,5-N,N'-bis(4-octyloxybenzoyl)benzamide) which anchors/immobilizes over the electrode surface without a binder.

The electrode modifier plays an effective role in significantly enhancing the signals of metals ions via preconcentrating them via metal complexation and decomplexation and acting as a stepping-stone between the host (transducer) and the guest (metal ions). The designed device is droplet-based which skips the diffusional step and consequently generates intense signals suitable for quantification and sensing minute concentration of analytes up to picomolar concentration. The ability of the proposed electrode modifier and the sample droplet drying approach results in leaving the analyte residue on the modified electrode surface, which then leads to the enhancement (sharpening/narrowing) of the stripping signals with higher current intensity of the metal ions, helping to obtain signals from 11 metals in the potential window of the electrode.

The major features in accordance with the present invention include simultaneous detection of 11 types of ions of different metals, well defined and well resolved oxidative signals (without any overlapping) of 11 electro-reduced metal ions, simultaneous removal of 11 types of metal ions from wastewater, recovery of 11 metals, and a stable electrode modifier of the device that does not demand any binder and without binder it remains firmly anchored with the electrode and does not leach away into solution to cause any secondary pollution. The device and its working are sustainable because its function is not only to detect toxic metal ions but also removal. Moreover, it is sustainable in the sense that its sensing surface after use can be cleaned and thus reused again for application. In spite of the firm attachment of the electrode modifier with the transducer/glassy carbon electrode, the modified electrode is reusable, i.e., after use, the modifier can be removed by putting the modified electrode in DMSO which dissolves ADB, and the working of the device demands just a droplet (10 L) of the sample containing ions of 11 types of metals. The proposed device reliably senses the targeted metal ions thousand times below the permissible exposure level (PEL) and can also sense these metal ions with concentration equal to or above the PEL. The device works in a number of electrolytes such as aqueous solution of NaCl, phosphate buffer (pH 7), HCl, $H_2SO_4$, KCl, NaOH, $H_3BO_3$, acetate buffer solution of pH 5, and Britten Robinson Buffer (BRB). However, BRB is the best medium for working of the device as the most intense signals are obtained in BRB of pH 4.

In accordance with another embodiment of the present invention, a method of detecting multiple co-existing metal ions from a solution sample is also proposed, the method comprising placing a droplet of the solution sample on a working electrode surface, drying the working electrode surface followed by applying a second droplet of a pH indicator solution on the electrode surface, leading to conversion of the co-existing metal ions to corresponding metal atoms and deposition/electroplating of the metal atoms on the working electrode surface. The working electrode is a glassy carbon electrode modified with amino-functionalized multi-walled carbon nanotubes (MWCNTs-$NH_2$) and an amide derivative of benzoic acid (ADB). The deposited metals are removed from the electrode and the cleaned electrode is used again for modification with an amide derivative of benzoic acid (ADB) and amino-functionalized multi-walled carbon nanotubes (MWCNTs-$NH_2$) for further removal of metals. The method further comprises scratching the metal atoms from the electroplated working electrode; and dissolving the modifier (ADB and $NH_2$-fMWCNTs) by putting the electroplated working electrode in a mixture of dimethylformamide (DMF) and dimethyl sulfoxide (DMSO).

This invention deals with the designing and application of an electroanalytical device/sensor. It senses eleven different metal ions individually and simultaneously. These eleven metal ions are: Zn(II), Tl(I), Cd(II), Pb(II), Ni(II), As(III), Cu(II), Hg(II), Fe(III), Sr(II), and Ce(III). Among these Zn(II), Cu(II), Fe(III) and Ni(II) are essential metal ions as required for biological functions in small amount. However, Tl(I), Cd(II), Pb(II), As(III) and Hg(II) are extremely toxic. While Sr(II), and Ce(III) are neither essential nor very toxic in small amounts. However, all metals are toxic at high concentrations. The designed device consists of glassy carbon electrode modified with amino-functionalized multi-walled carbon nanotubes (MWCNTs-$NH_2$) and an amide derivative of benzoic acid (ADB) and over the surface of the modified electrode, droplet of metal ions solution is air dried and then a droplet of Britton Robinson Buffer (BRB) is placed over it in which the probes of counter electrode and reference electrodes are brought in contact with the droplet. In this way a droplet cell is constructed containing tips of three electrodes dipping in the droplet but not touching one another. The three electrodes are working electrode (GCE modified with $NH_2$-fMWCNTs and ADB), counter electrode (platinum wire) and reference electrode (Ag/AgCl). The amide derivative of benzoic acid is N-{4-[2-(1,3-Benzoxazolyl)] phenyl}-3,5-N,N'-bis(4-octyloxybenzoyl)benzamide.

a. The metal ion detection role of the device involves electroreduction and stripping steps through the application of time-based deposition potential followed by scanning from negative to positive potential values.

b. The metal removal from wastewater involves electroreduction step of the device in wastewater without carrying out the stripping step followed by removal of the device from wastewater.

c. The metal recovery aspect involves the modified electrode of the device being taken out from wastewater and subjected to scratching of the electro-reduced/electroplated metals. The process of electroreduction steps in wastewater and scratching the metals from electroplated electrode in a separate vessel are repeated for maximum recovery of metals. The scratched materials will contain not only metals but also ADB and $NH_2$-fMWCNTs (components of the electrode modifier) and some amount of the glassy carbon scratched from the electrode surface. Putting the scratched materials in a mixture of DMF and DMSO dissolves/removes ADB and $NH_2$-fMWCNTs from which the undissolved metals are separated. Another way of removing metals from the electroplated electrode is to subject it to multiple consecutive oxidative stripping steps in a separate vessel/cell containing distilled water or BRB of pH 4. The electroplated metals strip off from the electrode as metal ions and leave the electrode surface owing to their solubility in water.

Electroreduction is followed by taking the electroplated electrode out from wastewater and then scratching the metals from the electrode surface or putting the metals electroplated electrode in mixture of DMF and DMSO which can dissolve the electrode modifier. The dissolution of electrode modifier also removes metals from the modified electrode. The stable electrode modifier of the device does not demand any binder and without a binder it remains firmly anchored with the electrode and does not leach away into solution to cause any secondary pollution.

Another way of removing metals from the electroplated electrode is to subject it to multiple consecutive oxidative stripping steps in a separate vessel/cell containing distilled water or Britton Robinson Buffer (BRB) of pH 4. The electroplated metals strip off from the electrode as metal ions and leave the electrode surface owing to their solubility in water. Equal concentration of all metal ions generates signals of variable intensity due to variation in their charge density and electrical conductance. Therefore, for comparable signal intensity of all metal ions, their concentration ratio is set according to metal ions charge transfer characteristics. Hence, the device is ratiometric. The device serves its metal ions detection/sensing purpose in a number of electrolytes with the best response in BRB. In BRB solutions of different pH (2-10), the sensor responds to metal ions with better signal intensity in acidic pH 2-6 and with the most intense signals at pH 4. The signals of these eleven metal ions appear in the same voltammogram obtained through the designed electrochemical device when potentially scanned from −1.5 to 1.5 V for the simultaneous sensing of all these metal ions present in the same solution. The device also responds to solutions containing any of these individual ions or any combination of these ions present in the same solution. The response takes only 5 seconds; however, if more time is given, then more intense signals appear. The device demands 30 seconds for generating the most intense signals. Extending time from 30 seconds to 120 seconds and onward leads to reduction/decrease in the height/intensity of signals. Therefore, 30 seconds time is the best deposition/response time of the device.

The stable electrode modifier of the device that does not demand any binder and without binder it remains firmly anchored with the electrode and does not leach away into solution to cause any secondary pollution. The device reliably senses the targeted metal ions thousand times below the permissible exposure level (PEL) and can also sense these metal ions with concentration equal to or above the PEL. The device works reliably in acidic, neutral and basis media, however, acidic medium of pH 4 is the best for getting signals of picomolar concentration of 11 types of metal ions.

This designed device works in three possible ways/methods-either dipping its electrodes in solution of metal ions or placing the droplet of metal ions solution at the working electrode surface followed by drying via a drier which should be kept at a distance of least 20 cm away from the electrode surface so that contents of the droplet could not throw away from the electrode surface. The working electrode with surface dried droplet of metal ions solution is then immersed in the electrochemical cell containing BRB solution of pH 4 or the third method—the two droplets method involving drying of the first droplet of the metal ions solution at the working electrode surface followed by putting the second droplet (which is of BRB solution). The second droplet is not dried as it is required for recording voltammogram after completing the circuit through touching/connecting the counter and reference electrode with this droplet. All three methods are workable with quality of response in the form of more intense and consequently better resolved signals of all eleven metal ions. The final approaches demand only a small amount of the analyte, i.e., just a 10 uL droplet of the metal ions solution.

Discrimination among various metal ions is based on potential/voltage-based selectivity of the designed sensing platform. The application method (differential pulse anodic stripping voltammetry) of the sensor is responsible for resolving the issue of overlapping signals of metals with closer oxidation potentials. The differential nature of differential pulse voltammetry has the advantage of minimizing interfering background capacitive current and charging current with concomitant enhancement of Faradic current. These peculiar features make differential pulse voltammetry highly sensitive for the generation of intense signals of analytes.

The proposed device serves three purposes, namely detection, removal and recovery of 11 metals. The highlight of the device is that the electrode modifier does not give its own signals. The electrode modifier of the present device works as binder of itself, as electrocatalyst, and metal ions preconcentrating part of the host/transducer. Coupled with amino functionalized MWCNTs it confers/imparts high sensitivity characteristics to the electrode surface, thus leading to picomolar detection. The electrode modifier further does not cause any secondary pollution unlike mercury based and other toxic nano-materials based electrodes/electrode modifiers.

In an embodiment of the present invention, dimethylformamide—DMF or dimethyl sulfoxide—DMSO or mixture of DMF and DMSO is used dissolve the electrode modifier from the electrode for sensor reusability.

There are many industries which release a multitude of toxic metals. The wastewater of such industries demands a device which could sense all toxic metal ions. A sensor capable of sensing only one type of metal will not serve the desired purpose. Hence, sensing coexisting multi-metal ions simultaneously is one of the main objectives of the designed device and another purpose of the device is the removal of metal ions from wastewater. The principle of metals removal by the designed platform is based on electroreduction of metal ions. Every type of metal ions reduces to corresponding metals at certain specific reduction potential, so by applying cathodic potential on the working electrode, all metal ions electro-reduce and get converted to their corresponding metal atoms that electroplate over the surface of working electrode during deposition step of the applied method. On application of a positive potential scan, the electroplated metals start stripping as metal ions at corresponding oxidation potentials and thus every metal gets stripped off at a particular potential/voltage. The sequence of signals of stripping metal ions from negative potential to positive potential in the domain of −1.5 to +1.5 is given as Zn(II), Tl(I), Cd(II), Pb(II), Ni(II), As(III), Cu(II), Hg(II), Fe(III), Sr(II), and Ce(III). If positive potential scanning step is not applied, then metals will remain electroplated over the electrode and hence the situation can be utilized for scratching metals from the electrode. In this way two objectives are achieved, i.e., removal of metal ions from water and recovery of metals. The scratched metals may then be used for any desired purpose of the corresponding metals. However, if the objective is only to detect metal ions, then electroreduction step must be followed by electro-oxidation, so that the stripping of metal ions could occur which generate oxidation signals from which the type and quantity of metal ions are assessed.

In accordance with another embodiment of the present invention, 1 mg of $NH_2$-fMWCNTs is mixed in 5 mL dimethylformamide (DMF) under ultra-sonication for 120 min. Then a 5 µl of the slurry is placed on pre-cleaned GCE and dried by a drier which should be kept at a height of least 20 cm away from the electrode surface, so that the slurry could not be thrown away from the electrode surface. Solvent evaporation leaves a layer of the adsorbed $NH_2$- fMWCNTs. Modification of clean GCE with NH$_2$-fMWCNTs imparts sensitivity characteristics by enhancing conductivity features. Then a 5 µl droplet sample (from a 0.01 mM TBD solution in DMSO) is placed over the surface of NH$_2$-fMWCNTs modified GCE and this droplet is also dried. The as prepared modified electrode is designated GCE/NH$_2$-IMWCNTs/ADB. For application as a sensor, a 10 µl droplet sample of metal ions loaded wastewater is dried over the surface of GCE/NH$_2$-fMWCNTs/ADB and voltammogram is recorded either in an electrochemical cell containing a few mL BRB or in the droplet of BRB paced over GCE/NH$_2$-fMWCNTs/ADB/metal ions and completing the cell assembly by bringing the probes of counter and reference electrodes in contact with the BRB solution. The droplet of BRB is not dried because aqueous solution of this electrolyte is required for the stripping of metal ions from metals electroplated over the modified electrode surface during electroreduction step of the differential pulse anodic stripping voltammetry.

FIG. 1 illustrates the designing of the proposed electrochemical device working on two droplets method and its metal ions sensing performance. The device consists of a glassy carbon electrode (GCE) modified with amino-functionalized multi-walled carbon nanotubes (MWCNTs-NH$_2$) and an amide derivative of benzoic acid (ADB). 1 mg of NH$_2$-fMWCNTs is mixed in 5 mL dimethylformamide (DMF) under ultra-sonication for 120 min. Then a 5 µl of NH$_2$-fMWCNTs slurry 102, is placed on pre-cleaned GCE 101, and dried by a drier. The drier is preferably kept at a height of at least 20 cm away from the electrode surface, so that the slurry could not be thrown away from the electrode surface. Solvent evaporation leaves a layer of the adsorbed NH$_2$-fMWCNTs on the surface of GCE, thereby enhancing conductivity features of GCE for sensitivity characteristics. Then a 5 µl droplet sample from a 0.01 mM TBD solution in DMSO (or ADB solution), indicated as 103, is placed over the surface of NH$_2$-fMWCNTs modified GCE and this droplet is also dried. The as prepared modified electrode is designated GCE/NH$_2$-IMWCNTs/ADB. A 10 µl droplet sample of metal ions (MI), indicated as 104, loaded wastewater is dried over the surface of GCE/NH$_2$-fMWCNTs/ADB for application as a sensor. A droplet of BRB as supporting electrolyte (SE), indicated as 105, is placed over GCE/NH$_2$-fMWCNTs/ADB/MI for recording voltammogram and completing the cell assembly by bringing the probes of counter and reference electrodes in contact with the BRB solution. The as prepared modified electrode is designated GCE/NH$_2$-fMWCNTs/ADB/MI/SE. A droplet cell is thereby, constructed containing tips of three electrodes dipping in the droplet but not touching one another. In an embodiment of the invention, the three electrodes are working electrode (GCE modified with NH$_2$-fMWCNTs and ADB), counter electrode (platinum wire) and reference electrode (Ag/AgCl). Unlike other solutions, the droplet of BRB is not dried because aqueous solution of this electrolyte is required for the stripping of metal ions from metals electroplated over the modified electrode surface during differential pulse anodic stripping voltammetry. On application of positive potential scan, the electroplated metals start stripping as metal ions at corresponding oxidation potentials and thus every metal gets stripped off at a particular potential/voltage. FIG. 1 shows signals of stripping metal ions from negative potential to positive potential in the domain of −1.5 V to +1.5 V.

Figure 2:
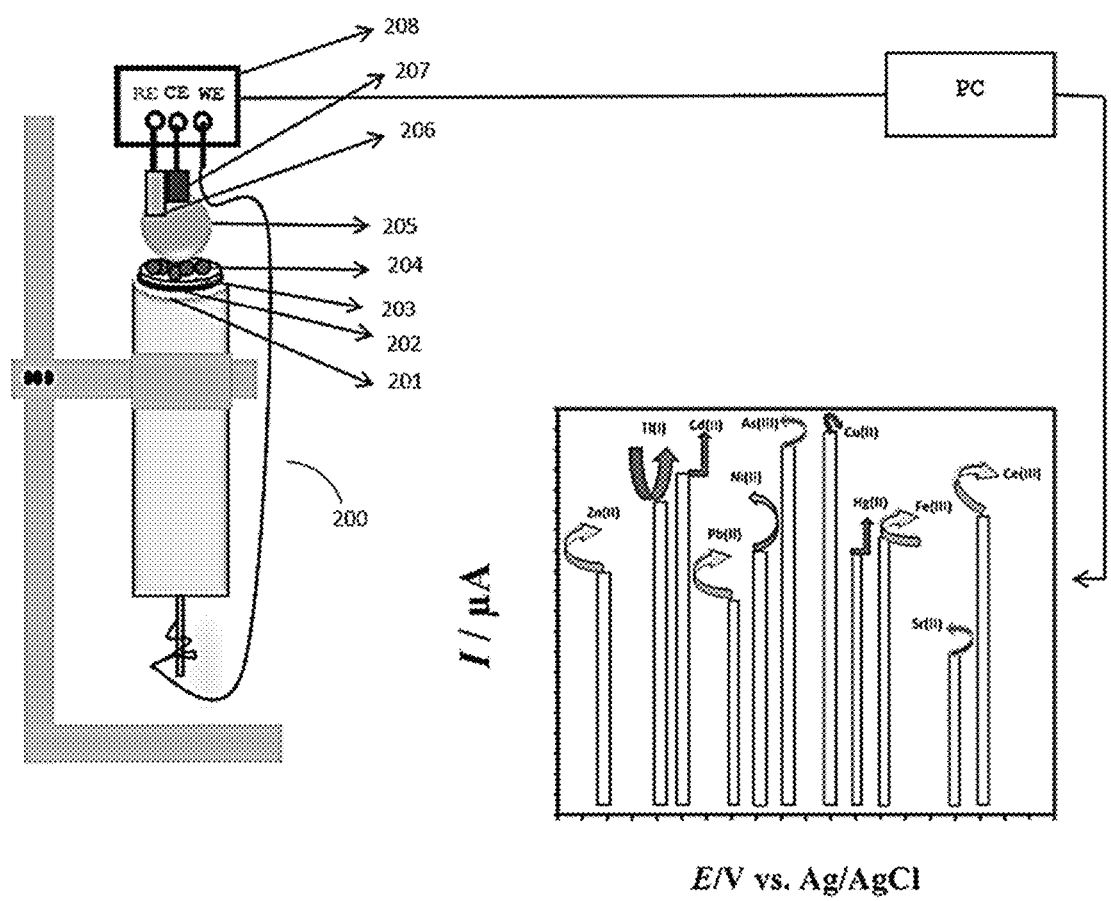
FIG. 2 shows various parts of the proposed electrochemical device and its metal ions detection performance, in accordance with the present invention.

FIG. 2 is a representation of the designed electrochemical device, showing its parts and further, the metal ions sensing application of the device. The electrochemical device 200 consists of modified glassy carbon electrode (GCE) 201, with a NH$_2$-fMWCNTs layer 202 and an ADB layer 203, the layers being left over GCE after drying their droplets. 204 indicates the residue of metal ions left after drying its droplet and 205 is the droplet of supporting electrolyte solution (or BRB). The device includes an Ag/AgCl reference electrode 206 and a platinum counter electrode 207 and a potentiostat 208. The sequence of signals of stripping metal ions from negative potential to positive potential in the domain of −1.5 V to +1.5 V is given as Zn(II), Tl(I), Cd(II), Pb(II), Ni(II), As(III), Cu(II), Hg(II), Fe(III), Sr(II), and Ce(III). The device demands 30 seconds time for generating the most intense signals and is considered the best deposition/response time of the device.

The closeness of the signals of metal ions helps in predicting the presence of the ores of these metals, meaning that if an ore of a particular metal is discovered, then possibility of the ore of the other metal beneath that ore could be envisioned. For example, the signals of Pb (II)), Ni(II) and Cr (III) occur at quite close potentials, so occurrence of these metals in the same ores are expected. Similarly Tl(II) and Cd(II) give signals at close potentials, so Tl and Cd metals are predicted to occur in the same ores. Similar is the case of As(III) and Cu(II). Fe (II) and Hg(II) also electro-oxidize at close potentials, hence, their signal can overlap. Getting separate signals of all eleven types of metal ions simultaneously at glassy carbon electrode is a challenge which is beaten if the glassy carbon electrode is modified with ADB and NH$_2$-fMWCNTs. The beauty of ADB based modified electrode is to get well defined and well resolved intense signals of all eleven types of metal ions or any of their combination. Moreover, ADB is stable over the electrode surface-meaning it does not leach into solution of metal ions. The reason is its poor solubility in water. This quality of ADB avoids the possibility of causing secondary pollution, meaning that if it would have been freely soluble in water, then it would have caused water pollution and sensor would not have been stable. Hence, ADB immobilized over the surface of glassy carbon electrode makes the sensor stable and provides hydrophobic groups for anchoring ADB with the glassy carbon electrode and hydrophilic functional groups that strongly attracts metal ions from aqueous solution/metal ions loaded wastewater. In other words, ADB immobilization/deposition at the electrode surface not only imparts sensitivity characteristics but also provides stability features. Its metal ions scavenging groups facilitate in enhancing the amount of metal ions at the sensor/solution interface and thus increase concentration of metal ions at the sensor surface causing more electrodeposition/electroreduction of metal ions during the deposition potential and deposition time and correspondingly significantly intense signals of metals oxidation appear during oxidative stripping scan.

Figure 3:
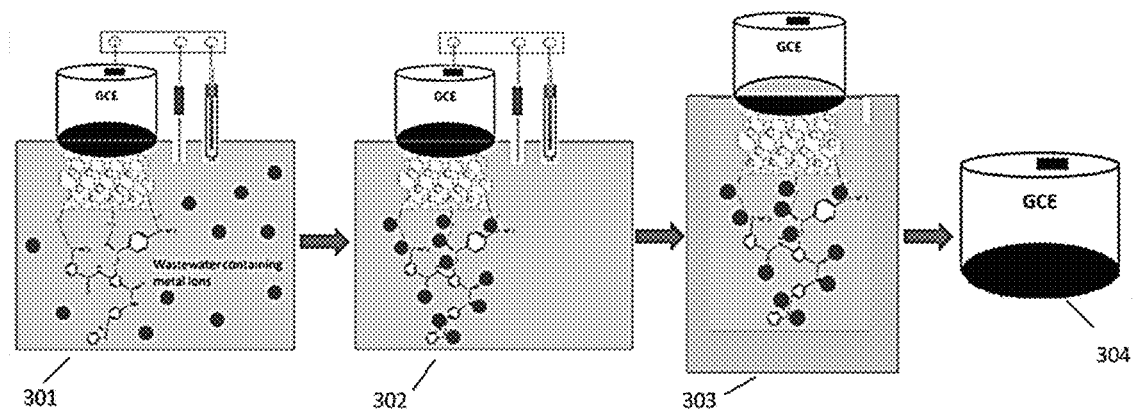
FIG. 3 depicts the working of the proposed electrochemical device for wastewater purification from metal ions, in accordance with the present invention.

FIG. 3 shows the working of the electrochemical device for wastewater purification from metal ions. Metal ions removal from wastewater involves an electroreduction step of the device in wastewater, indicated by 301. Metal ions are converted to corresponding metal atoms which get further deposited/electroplated on the working electrode during the deposition step, indicated by 302. In the form of atoms (electro reduced ions), metals are not soluble in water, while in ionic forms they are soluble. So electroreduction of metal ions to metal atoms helps in water purification. Electroreduction and deposition of metals is followed by taking the electroplated electrode out from wastewater and then putting the metals-electroplated electrode in mixture of DMF and DMSO which can dissolve the electrode modifier, as indicated by 303. The dissolution of electrode modifier also removes metals from the modified electrode. 304 shows the cleaned GCE obtained which is ready for modification again with new electrode modifier and for further usage for cleaning another batch of wastewater.

Figure 4:
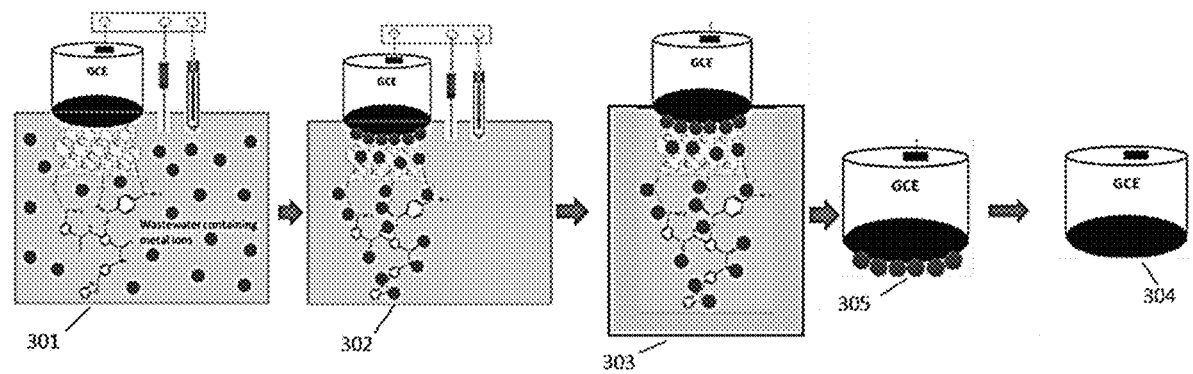
FIG. 4 shows metals recovery from wastewater using the designed invention, in accordance with the present invention.

FIG. 4 incorporates metal recovery from wastewater using the designed invention during wastewater purification. The recovery method involves filtration of DMF+DMSO solution in 303, containing dissolved $NH_2$-MWCNTs and ADB from the working electrode, for separating any undissolved metals from the solution. Further removal of left over metals at the glassy carbon electrode can be done by scratching, as indicated by 305.

The recovery of metals from wastewater is of paramount importance because metals have a number of useful applications. For example, lead (Pb) is used in lead-based paints and as an anti-knock agent in petrol. It is also used in lead-acid batteries, plumbing and to shield equipment from X-rays. Arsenic finds use in wood preservatives, agricultural chemicals and semiconductor technology. Cadmium is used in electroplating and battery production. Mercury is used in thermometers, pressure gauges, dental amalgam fillings, electronic switches and fluorescent lamps. Thallium is used in photocells, optical lenses, jewelry and superconductors. Chromium is used in electroplating, tanning and metal finishing. Cerium is used as a pigment and catalyst. It is also used in flat screen televisions, energy saving light bulbs and floodlights. Strontium is used in the manufacture of glass for color televisions, in the production of ferrite ceramic magnets, in flares and fireworks for their crimson color and in toothpaste for sensitive teeth. Similarly, copper, iron, nickel and zinc are used as essential components of many industrial tools and machines. As a result, all these metals are used extensively and their recovery from wastewater is highly desirable from an economic, environmental and sustainability perspective. Rapid industrialization and integration of industries has also led to the release of wastewater containing multiple metal ions. Electronic waste in today's electronic world has further exacerbated the level and variety of contaminants in wastewater. The growth of industries and the replacement of new electronic equipment, resulting in the disposal of old or damaged or obsolete electronic equipment, further increases the levels of toxic metals in soil and water. More than 8 types of metals are present in televisions, mobile phones and computers/laptops. Therefore, detection techniques with a wider range for the simultaneous detection of multiple metal ions can serve the purpose of dealing with effluents from integrated industries and electronic waste landfills.

With this objective the proposed device and the method of its working allows metals recovery. All its sensing 11 metal ions are recoverable by a two-step process-electroreduction followed by taking the electroplated electrode out from wastewater and then scratching the metals from the electrode surface or putting the metals electroplated electrode in mixture of DMF and DMSO which can dissolve the electrode modifier. The dissolution of electrode modifier also removes metals from the modified electrode. Further removal of left over metals at the glassy carbon electrode is done by scratching. Simple filtration removes metals from DMSO and DMF solution containing dissolved electrode modifier and undissolved metals. Finally, metals are separated from one another via liquation which is a metallurgical method for separating metals on the basis of melting point. For maximum metals recovery, either the process of device designing/electrode modification, its electroreduction and metals removal/scratching steps are to be repeated or multiple working electrodes be integrated into one device or large size electrode be used. Hence, the device has the provision to be scaled according to the requirement.

A sustainable solution demands detection followed by immediate removal of toxic metal ions from water. In this regard the proposed device has an additional advantage of toxic metal ions removal through electroreduction. In this way metal ions are converted to corresponding metal atoms which get deposited/electroplated on the electrode. In the form of atoms (electro reduced ions), metals are not soluble in water, while in ionic forms they are soluble. Electroreduction of metal ions to metal atoms helps in water purification, and after the electroreduction step the metal-deposited electrode is taken out from the wastewater. The deposited metals are removed from the electrode and the cleaned electrode is used again for modification with ADB and $NH_2$-fMWCNTs and utilization for further removal of metals. Hence, apart from multi-metals detection, the proposed device also serves the purpose of water purification from toxic metal ions.

Another important advantage of the designed device is the electrocatalytic role of ADB that causes signals of metals oxidation to shift to lower potentials as compared to the signals obtained on bare glassy carbon electrode. Thus, the stable anchoring of ADB over the electrode surface, and its ability of shifting the electro-oxidation signals of metals are appealing qualities of the designed sensor with respect to cutting the cost of potential/voltage and prohibition of secondary pollution which usually occurs in conventional sensors where electrode modifiers leach into solution (thus making the conventional sensor unstable with concomitant water pollution due to leaching away of the electrode modifier). The proposed device in accordance with the present invention serves its detection/sensing purpose in acidic, neutral and basis media with best sensing performance in acidic medium of pH 4. The designed device may conveniently and reliably detect metal ions simultaneously at, above and below their permissible exposure level (PEL). Their PEL in $mg/m^3$ are: As (0.01), Cd (0.005), Cu (1.0), Ni (1.0), Pb (0.05), Zn (5.0), Fc (10), Hg (0.05), Tl (0.1), St (0.01) and Ce (PEL is not yet established). The lower metal ions detectable level of our device is in $ng/m^3$.

Aiming to develop innovative and sensitive techniques for an early identification and response to pollution incidents—the proposed device serves the desired purpose of ensuring clean water availability and protecting the health of both humans and aquatic organisms. Examining and testing industrial wastewater by the designed device provides useful guidelines to policy makers and environmentalists and stakeholders of industries to set regulatory frameworks by establishing legal obligations and operational mechanisms for industries and businesses to comply with for protecting the environment from metals pollution and recovering metals to avoid economic loss. Thus, strengthening regulatory frameworks and enforcing strict pollution control measures are crucial for preventing and addressing metal ion contamination.

The invention is promising for various sectors such as metallurgical industries, electronics industry, steel industry, leather industry, battery industry, electroplating and metal machining, fertilizer industry, painting and coating industries, electronic waste management departments, risk management agencies, quality assurance agencies, water safety planners and researchers, water quality companies, food regulatory authorities, food quality assurance, hazard analysis and risk prevention agencies, fishery quality control, seafood quality control, pesticides management agencies, environmental toxicological diagnostics as well as healthcare and diagnostic laboratories.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A method of detecting multiple co-existing metal ions from a solution sample, the method comprising:
    placing a droplet of the solution sample on a working electrode surface;
    drying the working electrode surface followed by applying a second droplet of a pH indicator solution on the working electrode surface, followed by performing an electroreduction step leading to conversion of the co-existing metal ions to corresponding metal atoms and deposition/electroplating of the metal atoms on the working electrode surface,
    the working electrode comprising an amide derivative of benzoic acid (ADB) causing signals of metals oxidation to shift to lower potentials in comparison to signals obtained on a bare glassy carbon electrode, and enabling detection of the co-existing metal ions simultaneously at, above and below their permissible exposure levels (PELs),
    wherein the multiple co-existing metal ions detected in the same voltammetric scan up to picomolar concentration are Zn(II), Tl(I), Cd(II), Pb(II), Ni(II), As(III), Cu(II), Hg(II), Fe(III), Sr(II), and Ce(III).

2. The method of claim 1, further comprising creating a droplet cell by allowing probes of a counter electrode and a reference electrode to be brought in contact with the formed solution sample and pH indicator solution droplet mixture.

3. The method of claim 2, wherein the second droplet of the pH indicator solution is used for recording voltammogram readings after formation of the droplet cell.

4. The method of claim 1, wherein the co-existing metal ions are detected individually or in combination.

5. The method of claim 1, wherein the detection of the multiple co-existing metal ions is done individually or in combination simultaneously.

6. The method of claim 1, wherein the drying is done via a drier kept at a distance of at least 20 cm away from the working electrode surface.

7. The method of claim 1, wherein the pH indicator solution is Britton Robinson Buffer (BRB).

8. The method of claim 1, wherein the pH indicator solution is an aqueous solution of NaCl, phosphate buffer of pH 7, HCl, $H_2SO_4$, KCl, NaOH, $H_3BO_3$, or acetate buffer solution of pH 5.

9. The method of claim 1, wherein the working electrode is a glassy carbon electrode modified with amino-functionalized multi-walled carbon nanotubes ($MWCNTs-NH_2$) and the amide derivative of benzoic acid (ADB), wherein, before placing the droplet of the solution sample on the working electrode surface, the method comprises the steps of:
    forming an initial layer of the $MWCNTs-NH_2$ on the working electrode surface; and
    forming a subsequent layer of the ADB.

10. The method of claim 9, further comprising:
    scratching the metal atoms from the electroplated working electrode; and
    dissolving the ADB and the $MWCNTs-NH_2$ by putting the electroplated working electrode in a mixture of dimethylformamide (DMF) and dimethyl sulfoxide (DMSO).

11. The method of claim 1, wherein the metal atoms are removed from the working electrode and the working electrode can be used again.

* * * * *